United States Patent
Pasquero et al.

(10) Patent No.: US 9,558,714 B2
(45) Date of Patent: Jan. 31, 2017

(54) SYSTEM AND METHOD FOR CONTROLLING A DISPLAY OF A MOBILE DEVICE

(71) Applicant: BlackBerry Limited, Waterloo (CA)

(72) Inventors: Jerome Pasquero, Montreal (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 36 days.

(21) Appl. No.: 14/252,048

(22) Filed: Apr. 14, 2014

(65) Prior Publication Data
US 2014/0218287 A1  Aug. 7, 2014

Related U.S. Application Data

(63) Continuation of application No. 12/938,799, filed on Nov. 3, 2010, now Pat. No. 8,717,393.

(51) Int. Cl.
G09G 5/10 (2006.01)
G06F 3/01 (2006.01)
G06F 3/0487 (2013.01)

(52) U.S. Cl.
CPC ............. *G09G 5/10* (2013.01); *G06F 3/013* (2013.01); *G06F 3/017* (2013.01); *G06F 3/0487* (2013.01);
(Continued)

(58) Field of Classification Search
CPC .............. G09G 5/10; G09G 2320/0261; G09G 2330/022; G06F 3/13; G06F 3/17; G06F 3/0487
(Continued)

(56) References Cited

U.S. PATENT DOCUMENTS

5,638,176 A    6/1997 Hobbs et al.
6,393,136 B1   5/2002 Amir et al.
(Continued)

FOREIGN PATENT DOCUMENTS

EP    1672460 A1   6/2006

OTHER PUBLICATIONS

Katzmaier, D.; Sony Bravia XBR-46LX900 Flat-panel TV reviews CNET Reviews; "CNET editor's take"; Jan. 7, 2010; http://reviews.cnet.com/flat-panel-tvs/sony-bravia-xbr-46lx900/4505-6482_7-33943222.html; retrieved from internet Mar. 11, 2010.
(Continued)

*Primary Examiner* — Mark Regn
(74) *Attorney, Agent, or Firm* — Jon Gibbons; Fleit Gibbons Gutman Bongini & Bianco P.L.

(57) ABSTRACT

A method and system are provided for controlling the display of an mobile device by: capturing an image using a camera device of the mobile device, the camera device being directed in a same direction as a display of the mobile device, the image comprising one or more subjects (e.g. users or other humans seen in the image); determining a point of regard in the image for at least one of the one or more subjects, the point of regard being indicative of an area on the display at which a gaze of the corresponding subject is directed; determining, based on the point of regard, an instruction for controlling the display; and controlling the display according to the instruction, wherein controlling the display includes reducing visibility of at least one portion of what is displayed on the display.

20 Claims, 12 Drawing Sheets

(52) U.S. Cl.
CPC  *G09G 2320/0261* (2013.01); *G09G 2330/022* (2013.01)

(58) Field of Classification Search
USPC ........................................................ 345/690
See application file for complete search history.

(56) References Cited

U.S. PATENT DOCUMENTS

| | | | |
|---|---|---|---|
| 6,532,298 | B1 | 3/2003 | Cambier et al. |
| 6,539,100 | B1 | 3/2003 | Amir et al. |
| 6,665,805 | B1 | 12/2003 | Tsirkel et al. |
| 6,758,563 | B2 | 7/2004 | Levola |
| 7,027,619 | B2 | 4/2006 | Pavlidis et al. |
| 7,046,924 | B2 | 5/2006 | Miller et al. |
| 7,206,022 | B2 | 4/2007 | Miller et al. |
| 7,313,621 | B2 | 12/2007 | Gudorf et al. |
| 7,379,567 | B2 | 5/2008 | Azuma et al. |
| 7,440,592 | B1 | 10/2008 | Nimmer |
| 7,460,940 | B2 | 12/2008 | Larsson et al. |
| 7,591,558 | B2 | 9/2009 | Wezowski et al. |
| 7,630,524 | B2 | 12/2009 | Lauper et al. |
| 7,643,659 | B2 | 1/2010 | Cao et al. |
| 7,676,063 | B2 | 3/2010 | Cohen et al. |
| 7,705,877 | B2 | 4/2010 | Jackson |
| 2003/0052903 | A1* | 3/2003 | Weast ........................... 345/690 |
| 2005/0212759 | A1* | 9/2005 | Marvit ................. G06F 1/1613 345/156 |
| 2008/0034435 | A1 | 2/2008 | Grabarnik et al. |
| 2008/0111833 | A1* | 5/2008 | Thorn et al. .................. 345/690 |
| 2009/0082066 | A1 | 3/2009 | Katz |
| 2010/0183205 | A1* | 7/2010 | Pfleger ..................... A61B 5/16 382/128 |

OTHER PUBLICATIONS

TechEBlog Real-Time Eye Tracking; "Real-Time Eye Tracking"; Jul. 7, 2006; http://www.techeblog.com/index.php/tech-gadget/real-time-eye-tracking; retrieved from internet Mar. 10, 2010.

Capin, T. et al.; "Camera-Based Virtual Environmental Internaction on Mobile Devices"; 2006; Proceedings of 21st International Symposium on Computer and Information Sciences (ISCIS); Lecture Notes in Computer Science.

Harke, Michael; Search Report from corresponding European Application No. 10189808.8; search completed Feb. 7, 2011.

* cited by examiner

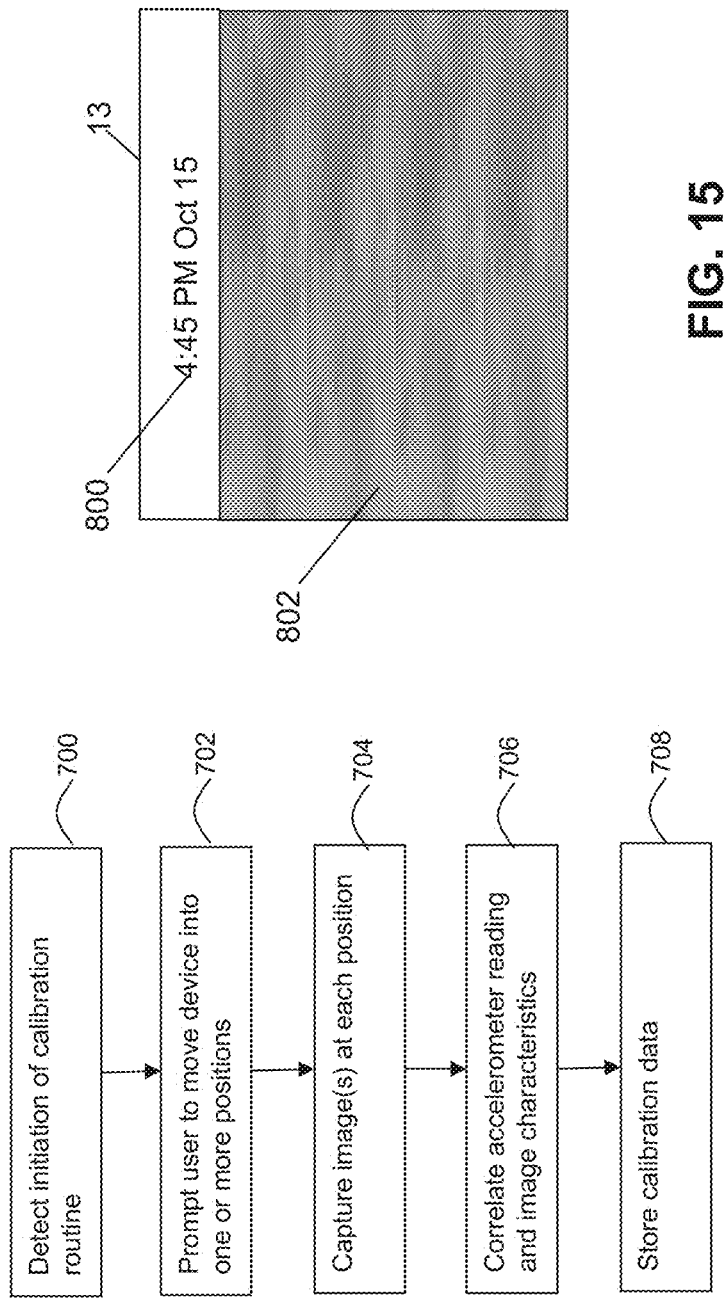

SYSTEM AND METHOD FOR CONTROLLING A DISPLAY OF A MOBILE DEVICE

CROSS-REFERENCE TO RELATED APPLICATIONS

The present application is a continuation of U.S. patent application Ser. No. 12/938,799 filed on Nov. 3, 2010 incorporated herein by reference.

TECHNICAL FIELD

The following relates generally to controlling a display of a mobile device.

DESCRIPTION OF THE RELATED ART

Many mobile devices include a display to provide a medium for the mobile device to present information to a user. Such mobile devices having a display can automatically dim or turn off its display after a predefined time-out period. For example, the time-out period can be defined as a certain length of time of inactivity of the mobile device's inputs (e.g. keyboard, number pad, buttons, touchscreen, trackball, trackpad, etc.). However, with a predefined time-out period, the display in some circumstances may be turned off while the user is still viewing the display. Such circumstances can occur, for example, if the user continues using the mobile device for a length of time that exceeds the time-out period without activating or otherwise using the inputs (e.g. while reading an e-mail or watching a video). On the other hand, the display may be left on after the user has stopped using the device for a length of time equal to the remaining portion (if any) of the time-out period in order to activate the automatic shut-off of the display.

BRIEF DESCRIPTION OF THE DRAWINGS

Embodiments will now be described by way of example only with reference to the appended drawings wherein:

FIG. 14 is a flow diagram of example computer executable instructions for calibrating a display controller module.

FIG. 15 is an example screen shot illustrating a portion of a screen of a mobile device being obscured with another portion unchanged.

DETAILED DESCRIPTION

Figure 1:
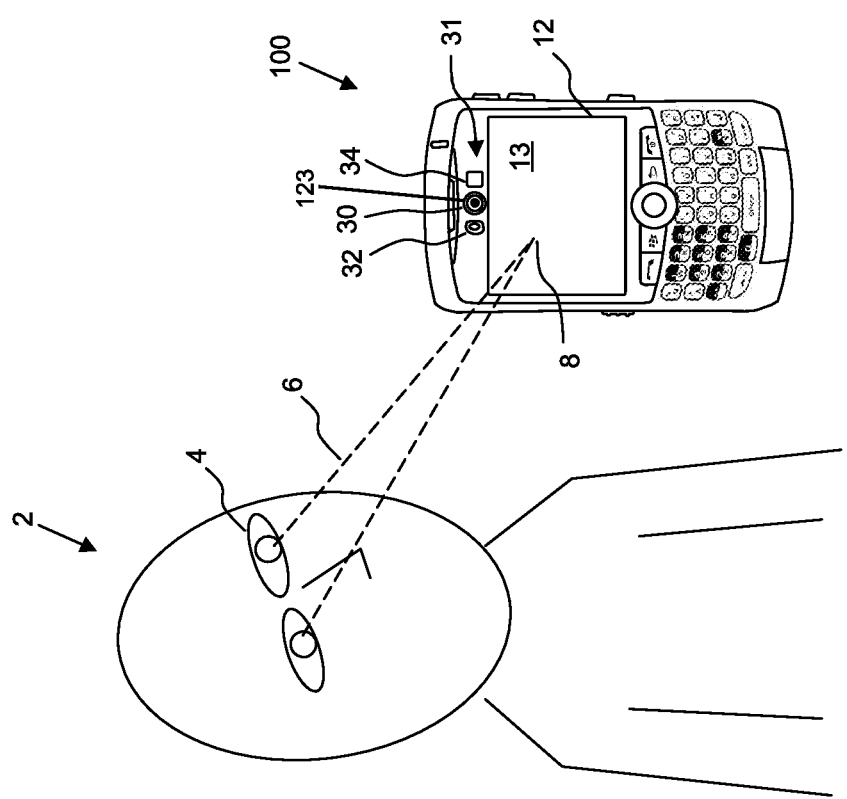
FIG. 1 is a schematic diagram of a user viewing the display of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

It has been recognized that methods for automatically controlling a display of an electronic device such as a mobile device are typically limited in their ability to determine when the device is being used and when it is idle. To address this, the following describes a method of controlling the display of an electronic device by: capturing an image using a camera device of the electronic device, the camera device being directed in a same direction as a display of the electronic device, the image comprising one or more subjects (e.g. users or other humans seen in the image); determining a point of regard in the image for at least one of the one or more subjects, the point of regard being indicative of an area on the display at which a gaze of the corresponding subject is directed; determining, based on the point of regard, an instruction for controlling the display; and controlling the display according to the instruction, wherein controlling the display includes reducing visibility of at least one portion of what is displayed on the display.

In some example embodiments, the method includes determining under what one or more criteria to track the one or more subjects using the camera device and capturing the image upon meeting the one or more criteria. The one or more criteria may be associated with any one or more of the following: a period time, a location associated with the electronic device, content being displayed on the display, and a mode of the electronic device.

The method may also include obtaining status information on the electronic device, and capturing the image based on the status information. The status information may include any one or more of the following: change in orientation, interactivity with one or more input devices, one or more applications currently being used, and a mode of the electronic device. The status information may also be used to determine under what one or more criteria to track the one or more subjects using the camera device and capturing the image upon meeting the one or more criteria as noted above.

The image may be captured upon determining that the electronic device is in a security mode and the instruction for controlling the display may corresponds to a manner in which to modify what is viewed on the display. The display can be modified by performing any one or more of the following: turning off the display, initiating a screensaver, dimming a backlight, adjusting a focus of content being displayed, and locking-out the device. In addition, one or more portions of what is being displayed can be modified such that the visibility of those one or more portions is/are reduced whereas the other portions (e.g. clock, ribbon, etc.) are displayed as they normally would. Controlling the display according to the principles discussed herein can be advantageous for security purposes, to conserve battery power, or both.

It can be appreciated that determining the point of regard can be performed using any one or both of eye tracking and face tracking.

Turning to FIG. 1, a schematic diagram of a user 2 viewing a display 12 of a mobile device 100 is provided. In this example, the mobile device 100 is situated in front of the user 2. The user 2 has a pair of eyes 4 that have associated therewith, a gaze direction 6 (i.e. the direction towards which the user is looking), and a point of regard 8 (i.e. an area at which the user is looking). In this example, the gaze direction 6 is towards the display 12, and the point of regard 8 falls on a viewing area 13 provided thereby. The mobile device 100 also has a front or forward-facing camera lens 30, a light source 32, and a distance sensor 34, collectively referred to as a camera device 31. The front camera lens 30, light source 32, and distance sensor 34 can be used to track the gaze direction 6 and point of regard 8 of the user 2. The point of regard 8 can be used to determine and thus control the display 12 in order to reduce the visibility of what is being displayed. For example, the mobile device 100 may be operable such that when the point of regard 8 falls within the viewing area 13, the display 12 is on (e.g. by illuminating a backlight), and when the point of regard 8 falls outside the viewing area 13, the display 12 is turned off. In other example embodiments described below, the presence of multiple points of regard 8, in particular when viewing sensitive data, can cause the visibility of the contents to be reduced (e.g. by turning off the screen) for security purposes.

It can therefore be seen that the display 12 can be effectively controlled by detecting that the user is looking at or away from the viewing area 13 of the display 12, or by detecting that a second user is looking at the viewing area 13. As will be discussed later on, the mobile device 100 can be configured to control the display 12 in various ways when one or more points of regard 8 are detected as being inside or outside the viewing area 13.

Examples of applicable electronic devices include pagers, cellular phones, cellular smart-phones, wireless organizers, personal digital assistants, computers, laptops, handheld wireless communication devices, wirelessly enabled notebook computers, camera devices, tablet computers, and the like. Such devices will hereinafter be commonly referred to as "mobile devices" for the sake of clarity. It will however be appreciated that the principles described herein are also suitable to other devices, e.g. "non-mobile" devices.

In an example embodiment, the mobile device can be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figures 2, 3:
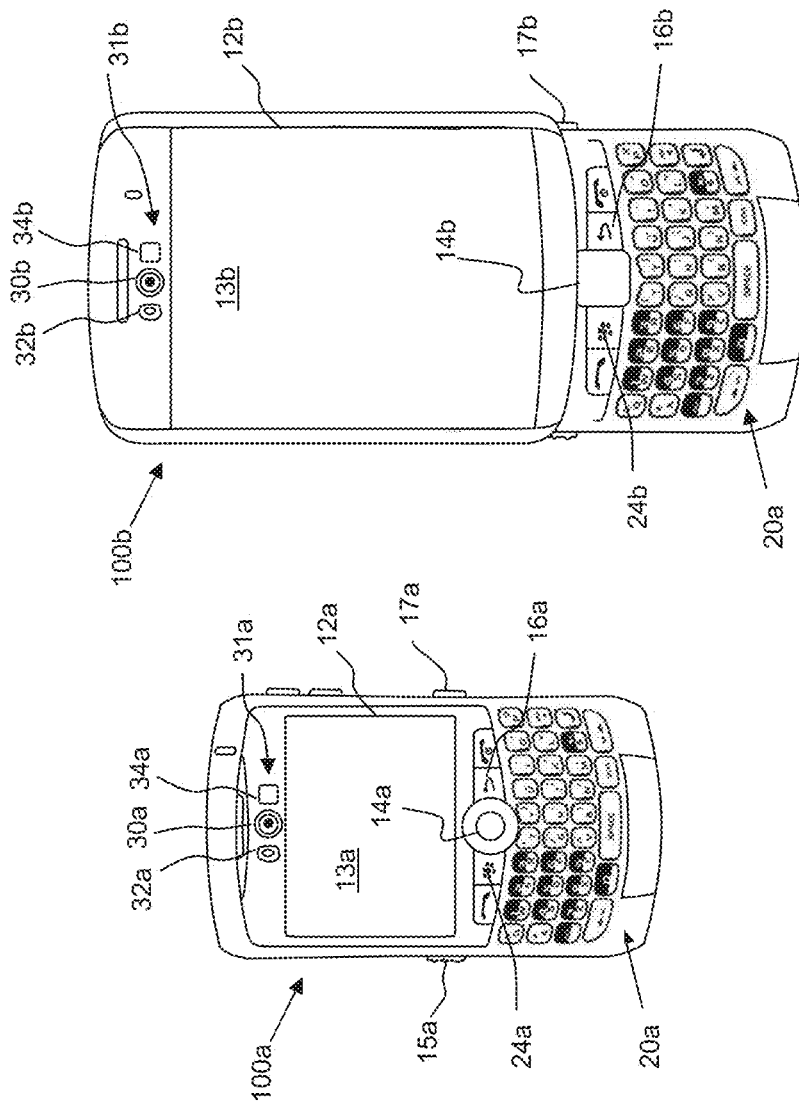
FIG. 2 is a plan view of an example mobile device and a display screen therefor.
FIG. 3 is a plan view of another example mobile device and a display screen therefor.

Referring to FIGS. 2 and 3, one example embodiment of a mobile device 100a is shown in FIG. 2, and another example embodiment of a mobile device 100b is shown in FIG. 3. It will be appreciated that the numeral "100" will hereinafter refer to any mobile device 100, including the example embodiments 100a and 100b, those example embodiments enumerated above or otherwise. It will also be appreciated that a similar numbering convention may be used for other general features common between all figures such as a display 12, a positioning device 14, a cancel or escape button 16, a camera button 17, and a menu or option button 24.

The mobile device 100a shown in FIG. 2 includes a display 12a with a viewing area 13a and the cursor or view positioning device 14 shown in this example embodiment is a trackball 14a. Positioning device 14 may serve as another input member and is both rotational to provide selection inputs to the main processor 102 (see FIG. 4) and can also be pressed in a direction generally toward housing to provide another selection input to the processor 102. Trackball 14a permits multi-directional positioning of the selection cursor 18 (see FIG. 5) such that the selection cursor 18 can be moved in an upward direction, in a downward direction and, if desired and/or permitted, in any diagonal direction. The trackball 14a is in this example situated on the front face of a housing for mobile device 100a as shown in FIG. 2 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input. It can be appreciated that the trackball 14a is only one example of a suitable positioning device 14. For example, a trackpad, touchscreen, OLED, or other input mechanism may equally apply.

The display 12 may include a selection cursor 18 that depicts generally where the next input or selection will be received. The selection cursor 18 may include a box, an alteration of an icon or any combination of features that enable a user to identify the currently chosen icon or item. The mobile device 100a in FIG. 2 also includes a programmable convenience button 15a to activate a selected application such as a calendar or a calculator. Further, mobile device 100a includes an escape or cancel button 16a, a camera button 17a, a menu or option button 24a and a keyboard 20a. The camera button 17a is able to activate photo and video capturing functions, e.g., when pressed in a direction towards the housing. The menu or option button 24a can be used to load a menu or list of options on the display 12a when pressed. In this example, the escape or cancel button 16a, the menu option button 24a, and a keyboard 20a are disposed on the front face of the mobile device housing, while the convenience button 15a and camera button 17a are disposed at the side of the housing. This button placement enables a user to operate these buttons while holding the mobile device 100 in one hand. The keyboard 20a is, in this example embodiment, a standard QWERTY keyboard, however, it will be appreciated that reduced QWERTY or virtual keyboards (e.g., as provided by a touchscreen) may equally apply.

The mobile device 100a also has a front camera lens 30a, a light source 32a and a distance sensor 34a, collectively referred to as a camera device 31a. The light source 32a may be used to illuminate an object (e.g., user 2) for capturing an image such as a photo, or a collection of images such as a video. The front camera lens 32a allows the light that represents an image to enter into the camera device 31*a*. The camera device 31*a* may be activated by pressing the camera button 17*a*. The distance sensor 34*a* measures or determines the distance between the front camera lens 32*a* and an object in the image captured by the camera device 31*a*.

The mobile device 100*b* shown in FIG. 3 includes a touch-screen display 12*b* with a viewing area 13*b*, and the positioning device 14 in this example embodiment is a trackpad 14*b*. The mobile device 100*b* also includes a menu or option button 24*b*, a cancel or escape button 16*b*, a camera button 17*b*, a convenience button 15*b*, a front camera lens 30*b*, a light source 32*b* and a distance sensor 34*b*. The front camera lens 30*b*, light source 32*b* and distance sensor 34*b* are collectively referred to as a camera device 31*b*. The mobile device 100*b*, as illustrated in FIG. 3, includes a standard reduced QWERTY keyboard 20*b*. In this example embodiment, the keyboard 20*b*, positioning device 14*b*, escape button 16*b* and menu button 24*b* are disposed on a front face of a mobile device housing.

It will be appreciated that for the mobile device 100, a wide range of one or more positioning or cursor/view positioning mechanisms such as a touch/track pad, a positioning wheel, a joystick button, a mouse, a touchscreen, a set of arrow keys, a tablet, an accelerometer (for sensing orientation and/or movements of the mobile device 100 etc.), OLED, or other whether presently known or unknown may be employed. Similarly, any variation of keyboard 20 may be used. It will also be appreciated that the mobile devices 100 shown in FIGS. 2 and 3 are for illustrative purposes only and various other mobile devices 100 are equally applicable to the following examples. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

To aid the reader in understanding the structure of the mobile device 100, reference will now be made to FIGS. 4 through 6.

Figure 4:
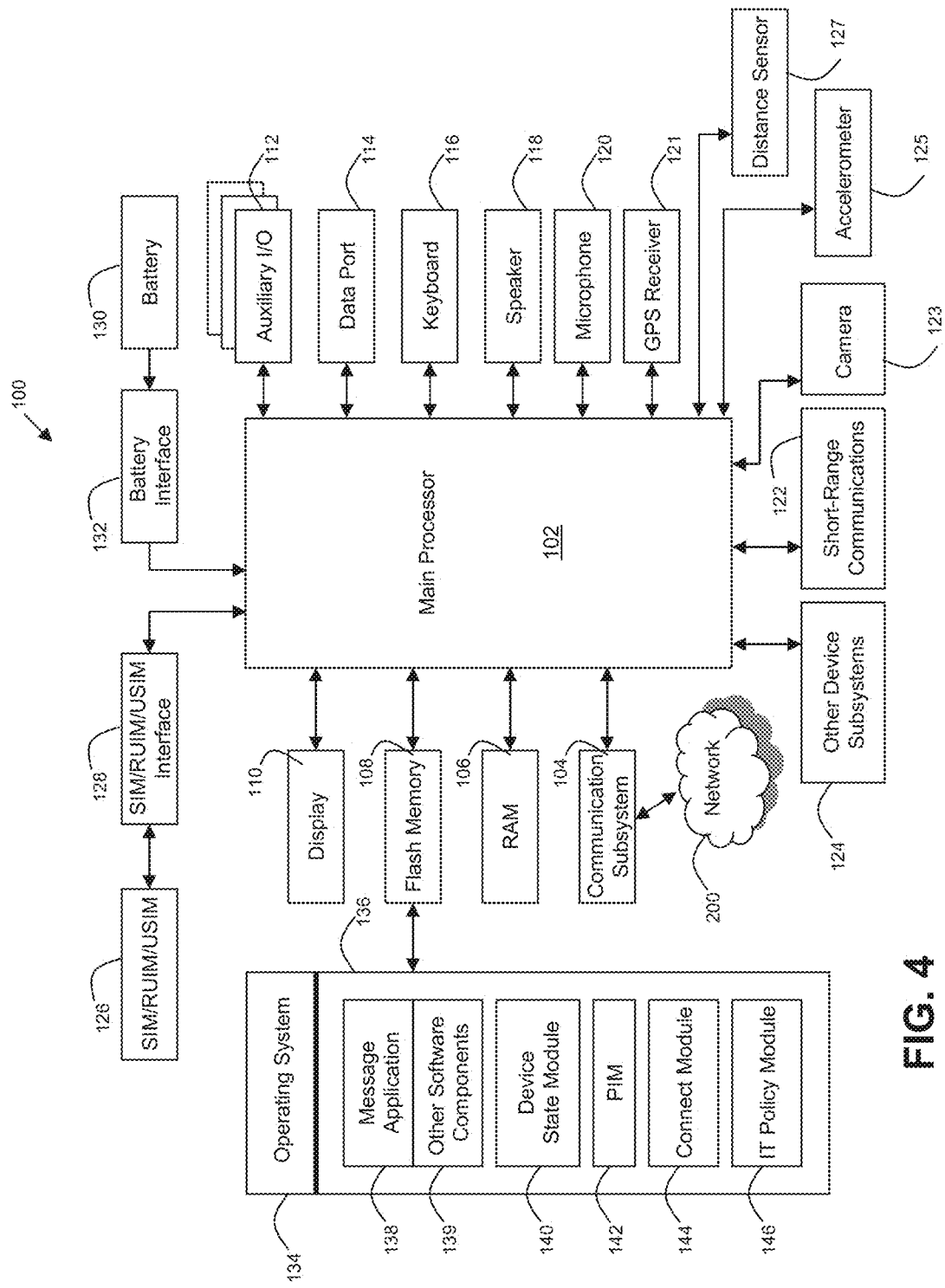
FIG. 4 is a block diagram of an example embodiment of a mobile device.

Referring first to FIG. 4, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, a camera 123, a accelerometer 125, a distance sensor 127 and other device subsystems 124. The display 110 can be a touch-screen display able to receive inputs through a user's touch.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is typically a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

Figure 5:
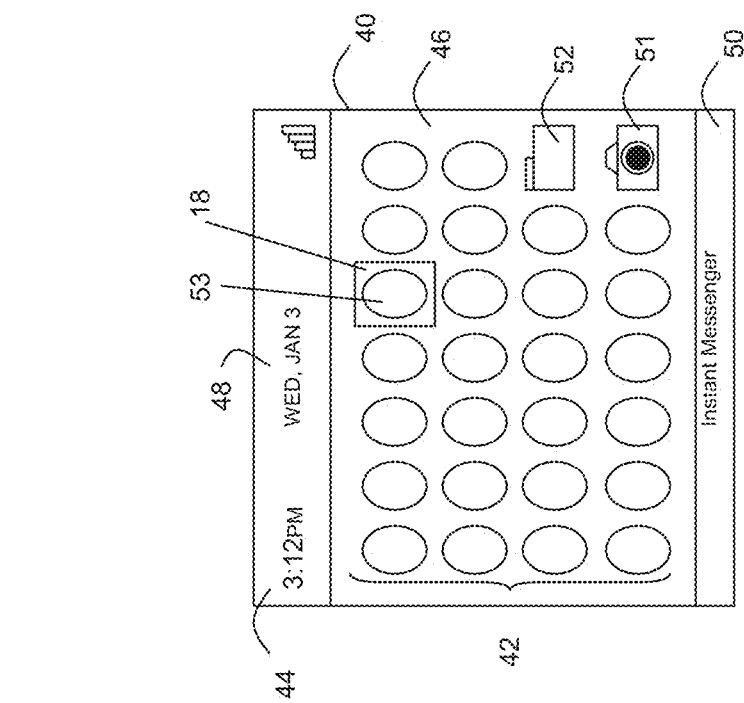
FIG. 5 is a screen shot of a home screen displayed by the mobile device.

Turning now to FIG. 5, the mobile device 100 may display a home screen 40, which can be set as the active screen when the mobile device 100 is powered up and may constitute the main ribbon application. The home screen 40 in this example generally includes a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 5 provides a grid of icons. It will be appreciated that typically several themes are available for the user to select and that any applicable arrangement may be used. An example icon shown in FIG. 5 is a camera icon 51 used to indicate a camera-based application such as a typical camera or video application for capturing images and video, or, as will be described below, a camera-based eye tracking display controller application 60 (see also FIG. 6). One or more of the series of icons 42 is typically a folder 52 that itself is capable of organizing any number of applications therewithin, as well as or instead of images, videos, data files, etc.

The status region 44 in this example embodiment includes a date/time display 48. The theme background 46, in addition to a graphical background and the series of icons 42, also includes a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 5, and providing a selection input, e.g. by pressing the trackball 14a.

Figure 6:
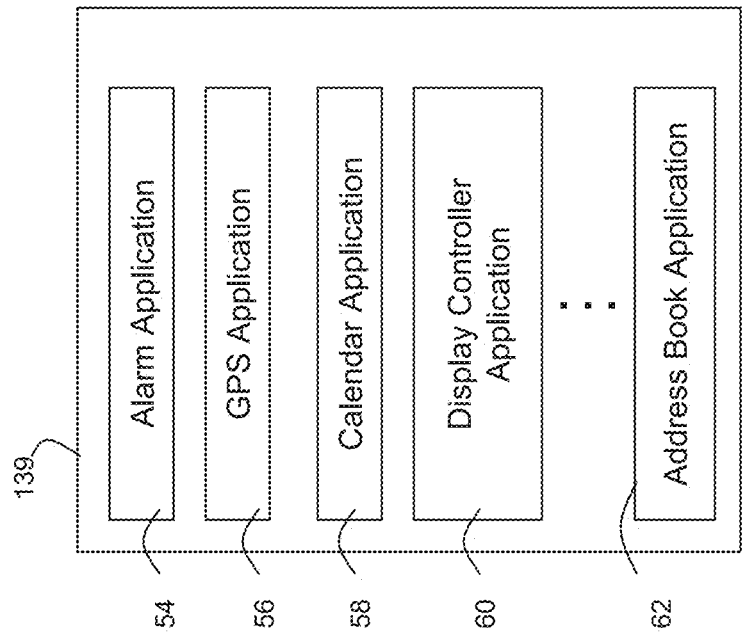
FIG. 6 is a block diagram illustrating example ones of the other software applications and components shown in FIG. 5.

FIG. 6 shows an example of other software applications and components 139 that may be stored and used on the mobile device 100. Only examples are shown in FIG. 6 and such examples are not to be considered exhaustive. In this example, an alarm application 54 may be used to activate an alarm at a time and date determined by the user. There is also an address book 62 that manages and displays contact information. A GPS application 56 may be used to determine the location of a mobile device 100. A calendar application 58 that may be used to organize appointments. Another example application is a display controller application 60. As will be discussed below, the display controller application 60 may be operable to control the display 12 of a mobile device 100 based on the point of regard 8 of a user 2.

Figure 7:
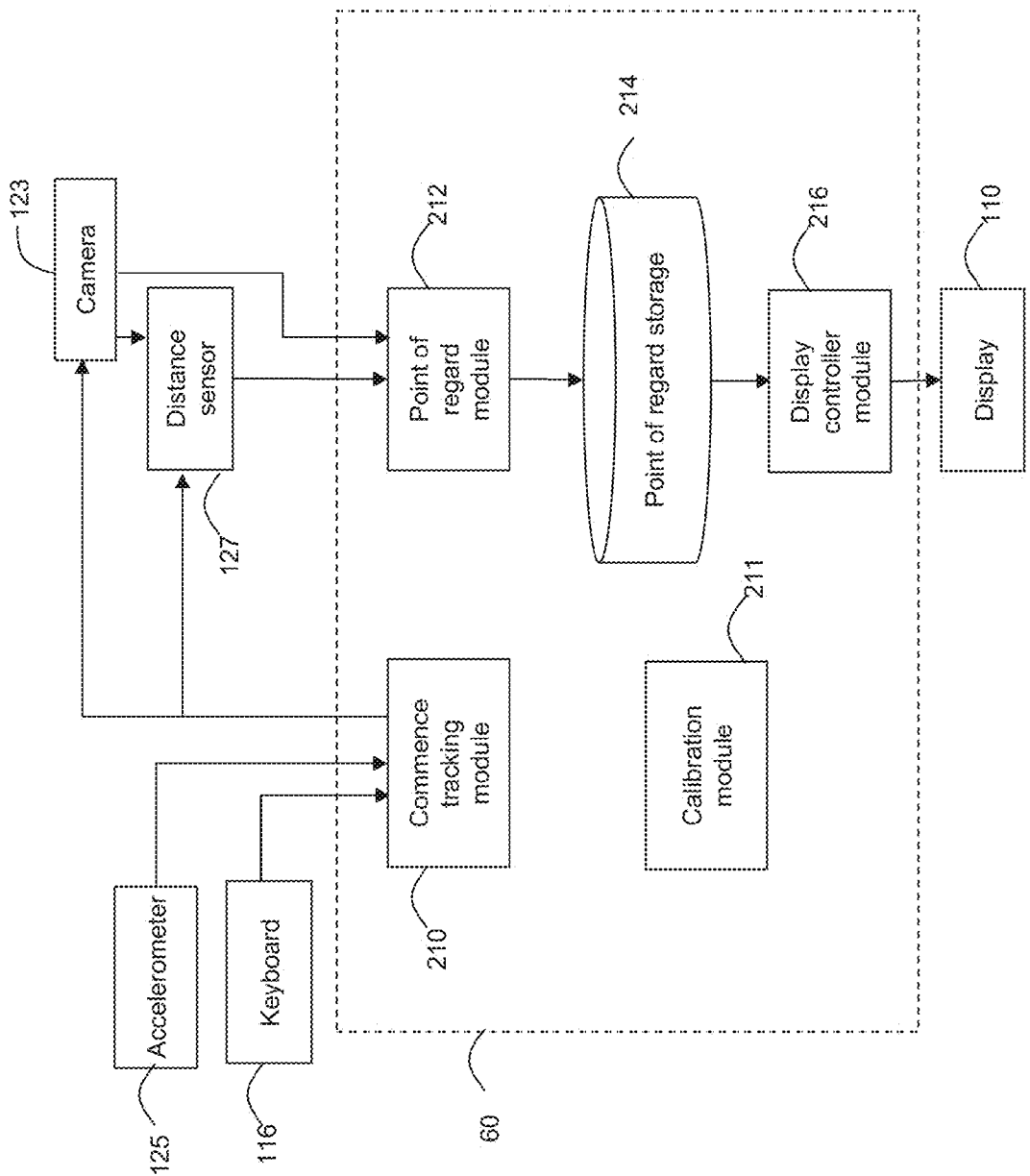
FIG. 7 is a block diagram of an example configuration of an eye tracking display controller application.

Turning to FIG. 7, an example configuration of the display controller application 60 is provided. The display controller application 60 can request details of activity occurring on, or receive inputs from, input devices such as the keyboard 116 and the accelerometer 125, in order to determine an estimate of interactivity with the mobile device 100. In some example embodiments, the keyboard 116 and accelerometer 125 send information regarding their respective statuses (e.g. activity information) to the display controller application 60. In other example embodiments the display controller application 60 polls the keyboard and accelerometer 125 to determine interactivity. It can be appreciated that the use of interactivity with the keyboard 116 and accelerometer 125 are only two examples and other input mechanisms such as touch-screen elements, buttons, etc. are also applicable. The display controller application 60 in this example also receives inputs from the distance sensor 127 and the camera 123 in this example. By obtaining such inputs, the camera 123 can obtain an image of the object (e.g. a user) as viewed or otherwise captured by the front camera lens 30, and then may send the image to the display controller application 60. The distance sensor 127 in this example is operable to obtain or calculate the distance between the front camera lens 30 and the object viewed by the front camera lens 30, and then send the information to the display controller application 60.

The display controller application 60 in this example also includes a commence tracking module 210 for determining when to instruct the camera 123 to take an image, which is communicable with the distance sensor 127 to determine the distance between the front camera lens 30 and the object in the image. The display controller application 60 also includes, in this example, a point of regard module 212 for determining the point of regard of the user 2 in an image, a point of regard storage 214 for storing point of regard data, a calibration module 211 for calibrating the display controller application 60, and a display controller 216 for sending instructions to the display 110 to modify the properties of the display 12 (e.g. power, brightness and content displayed), in order to reduce visibility of what is being displayed.

The commence tracking module 210 obtains information about the status of the mobile device 100 from various components and device subsystems (see FIG. 4) of the mobile device 100. In the example shown in FIG. 7, the eye tracking display controller application 60 obtains status information (e.g. activity information) from the keyboard 116 and accelerometer 125 device subsystems. For example, using status information from the keyboard 116 and accelerometer 125, the commence tracking module 60 is able to determine whether to instruct the camera 123 to capture an image and the distance sensor 127 to take or otherwise obtain a reading.

The point of regard module 212 obtains an image from the camera 123 and the distance between the front camera lens 30 and the object captured in the image from the distance sensor 127. Using the image, the point of regard module 212 is able to detect a user 2 or subject, if one can be found in the captured image. Using the image and the distance reading, the point of regard module 212 is then able to calculate the point of regard 8 of the user 2 or subject in the image. The point of regard information is stored in the point of regard storage 214.

The calibration module 211 can be used to enable the display controller application 60 to train itself for detecting subjects in the image and how they look in the image and what readings of the accelerometer correspond thereto. For example, the display controller application 60 can initiate a training process to have the user 2 look at the device in different positions (e.g. held to the left, right, above, below, etc.) in order to be able to calibrate how to detect the point of regard 8. It may be noted that during the calibration process, the display controller application 60 can be operable to prompt the user to both look straight at the display 12 for a particular held position, and then look away from the mobile device 10 at the same position. In this way, the display controller application 60 is provided with two points of reference to thereafter judge whether or not the user is likely glancing at the display 12.

The display controller module 216 retrieves the point of regard information from the point of regard storage 214 and uses this information to select instructions to send to the display 110.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Figure 8:
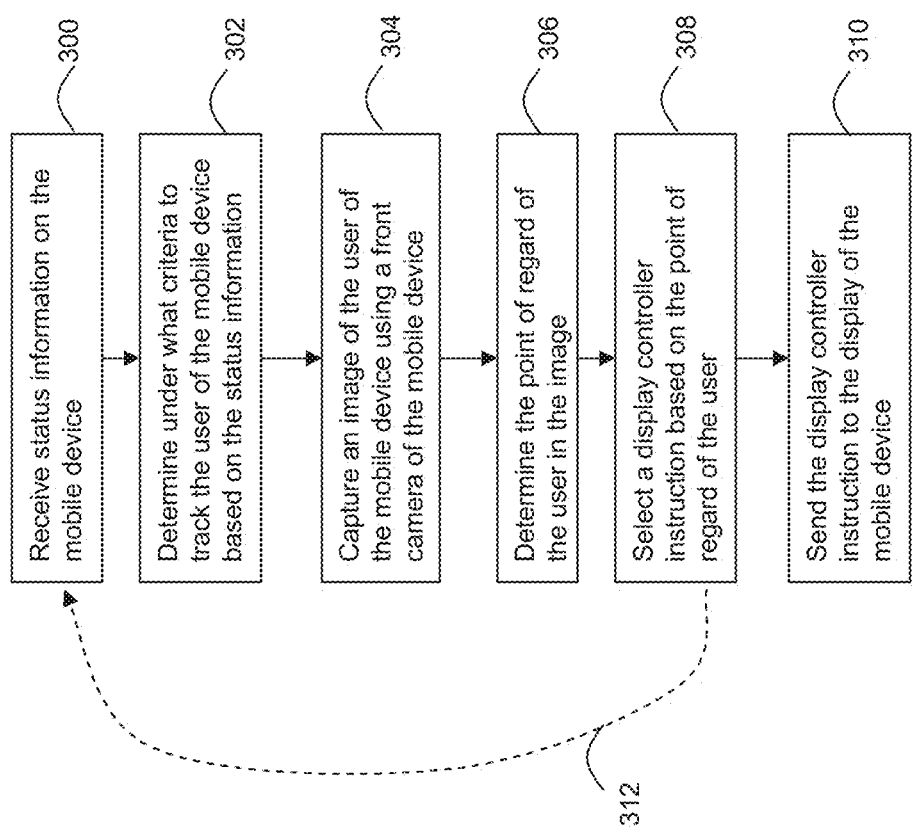
FIG. 8 is a flow diagram of example computer executable instructions for controlling a display based on a user's point of regard.

Turning to FIG. 8, example computer executable instructions are provided for controlling the display 12 of a mobile device based on eye tracking. At block 300, status information on the mobile device 100 is received or otherwise obtained. For example, the status information can include, without limitation, a change in orientation of the mobile device 100, interactivity with one or more input devices, one or more applications currently being used, and a mode (e.g. security mode) of the mobile device 10. Based on the status information, under what criteria to track the user 2 of the mobile device 100 is determined at block 302. For example, a period of time, specified area or location, use of a particular application, presence of a plurality of subjects in a field of view of the camera device, mode of the device, etc. can be used to determine how long or under what circumstances to track the user 2. At block 304, an image of the user 2 of the mobile device 100 is captured using the front camera lens 30 of the mobile device 100. Using the image captured in block 304, the point of regard 8 of the user 2 as captured in the image is determined at block 306. At block 308, a display controller instruction is selected based on the point of regard 8 of the user 2. For example, the instruction may correspond to a manner in which to modify what is viewed on the display 12 to reduce the visibility thereof (e.g. turning off the display 12, initiating a screensaver, dimming a backlight, adjusting a focus of content being displayed, locking-out the device, etc.) The instruction may also correspond to a manner in which one or more portions of what is being displayed is/are modified to reduce visibility thereof whilst leaving the other portions to be displayed normally. It has been recognized that in addition to or rather than reducing the visibility of everything on the display 12, where the display 12 is capable of, for example, dimming one portion while leaving another portion as is, part of the display 12 can be obscured or concealed without affecting other, typically less sensitive portions of the display 12 such as the clock or ribbon. Such an example is shown in FIG. 15 wherein a clock and date/time information portion 800 is unaffected while the remaining portion 802 of the screen 13 is obscured or blurred.

As noted above, status information on the mobile device 100 is received or otherwise obtained at block 300. In the example configuration of the display controller application 60 shown in FIG. 7, the status information may include the keyboard activity and the accelerometer activity. It can be appreciated that the status information can include other information on the mobile device 100 such as the activity of other inputs, the current state of the display and user profile settings. The nature of the status information can depend on the criteria used in block 302 to determine a time to track the user 2.

Figure 9:
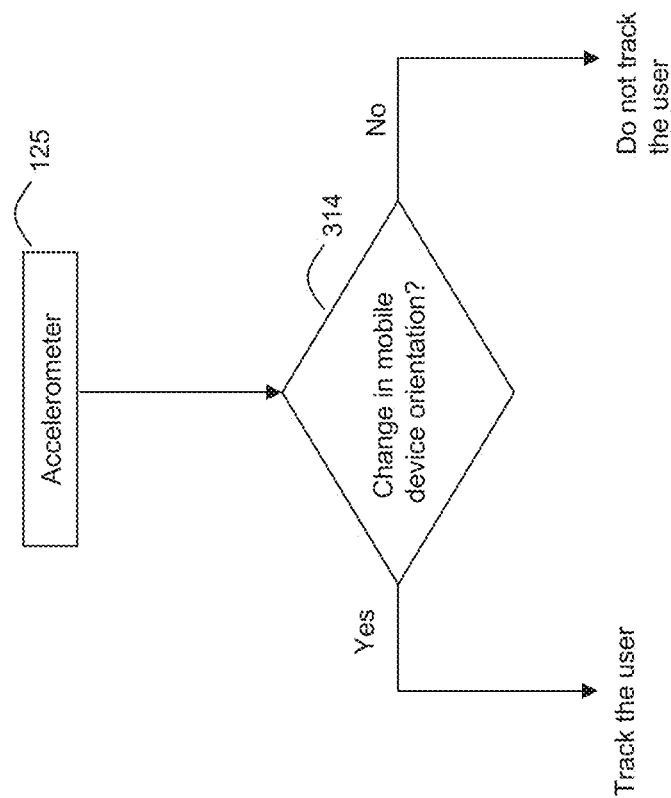
FIG. 9 is a flow diagram of an example process for determining a length of time to track a user of a mobile device.

As also noted above, at block 302, under what criteria to track the user 2 is determined. In the example configuration of FIG. 7, block 302 may be implemented by the commence tracking module 210. An example of a process to determine a time to track the user is provided in FIG. 9. In FIG. 9, the accelerometer 125 provides the status information of the mobile device 100 or the commence tracking module 210 requests status information. At block 314, the accelerometer 125 status information, thus obtained, is evaluated for activity. If the accelerometer 125 status information indicates activity (e.g. the mobile device 100 is being picked up or put away), block 314 determines it is time to track the user 2. The relative activity according to the accelerometer 125 can suggest that the mobile device 100 is going to be used (e.g. the mobile device 100 is picked up) or the mobile device 100 is no longer being used (e.g. the mobile device 100 is being put away). In either case, the display 12 can be instructed to perform a change in state from off to on or vice versa and, as such an accelerometer 125 can be used to provide an indication of a change in use of the display 12.

It can be appreciated that the accelerometer status information can be used to improve the efficiency of the display controller application 60. For example, by taking readings from the accelerometer 125 while tracking a user 2, changes in orientation can be detected between images that would indicate that the process could be aborted or that a change in how the subject appears in the image should be expected. This allows the display controller application 60 to make the process faster when taking the next image. For example, in cases where the mobile device 100 is flipped or otherwise rotated quickly, the accelerometer 125 can easily detect that this motion corresponds to a situation wherein the user is likely not looking at the mobile device 100. That is because in such a case, for the user to be looking at the mobile device 100 they would need to be also turning or flipping themselves through the same motion, which is unlikely. As a result, the display controller application 60 can detect that eye-tracking is not applicable at that time and can instruct the camera 123 to not take the next image (or fail to instruct the camera 123 to take the next image) at that time.

In another example embodiment, rather than or in addition to, the status information is provided by or requested from the keyboard 116. If the keyboard 116 is in use, the user is more likely to be viewing the display 12 and there may therefore be no need to track the user 2. However, inactivity in the keyboard 116 can conversely suggest that the mobile device 100 is not in use and the user 2 should be tracked to confirm this.

In yet another example embodiment, the status information can be based on the type of content that is being displayed. Based on the content type, block 302 can increase or decrease the frequency in which the user 2 is tracked. For example, the tracking frequency can be proportional to the sensitivity of the content being displayed. The display of private and confidential e-mail could increase the tracking frequency so that the display 12 is immediately turned off once the user 2 is not viewing the display 12 to minimize the opportunity for others to view the content. In contrast, a music playlist would be an example of display content that would require less frequent tracking of the user 2.

It is appreciated that other information about the mobile device 100 can include status information for determining a time to track the user 2. A combination of information may also be used (e.g. accelerator, keyboard and content type together).

At block 304, an image of the user in the example embodiments shown herein is captured using the front camera lens 30 of the mobile device 100. In one example embodiment, a light source 32 adjacent to the front camera lens 30 is used to illuminate an object when captured by the front camera lens 30 and, as a result, capture an image of what is being illuminated by the light source 32, e.g. the user 2. It can be appreciated that the light source 32 can be of any suitable type, including visible light, infrared light, etc.

As noted above, at block 306, the point of regard of the user 2 captured in the image taken by front camera lens 30 is determined. Example methods of implementing block 306 are now provided. In one example embodiment, block 306 can be implemented by using eye tracking algorithms or analytics (i.e. a routine or set of instructions for tracking the gaze direction 6 of the user's eyes 4), in order to calculate the point of regard 8.

By way of background, the concept of eye tracking is well known and a number of different techniques have been developed for accomplishing eye tracking. A commonly used technique is based on so-called pupil center corneal reflection (PCCR) methods. PCCR methods typically involve using a camera device 31 to capture an image of a user 2 while the user 2 is being illuminated by the light source 32. It has been found that PCCR methods may work optimally when using an infrared light source 32, however, the principles may be applied using visible light sources 32. The light source 32 illuminates the user's eyes 4 and the illumination causes highly visible reflections of the light in parts of the user's eyes 4. A fraction of the light enters the pupil and is reflected off the retina to identify the pupils of the eyes 4. A fraction of the light is reflected off the cornea of the eyes 4, the reflection often referred to as a "glint". Using known image processing techniques, the centers of the pupil and the glint are identified and a vector from the center of the glint to the center of the pupil is calculated. The direction of this vector provides gaze direction information which is used with the distance between the camera device 31 and the user's eyes 4 to calculate the point of regard 8 using known methods.

In another example embodiment, block 306 can be implemented by using face tracking algorithms or analytics (i.e. a routine or set of instructions for tracking the facial plane orientation of a user's face) to approximate the point of regard 8. The concept of face tracking is well known and a number of different techniques have been developed for accomplishing automatic face tracking.

At block 308, a display controller instruction is selected based on the point of regard 8 that was determined at block 306. In the example embodiment shown, if the point of regard 8 is outside the viewing area 13 of the display 12, the display controller 60 selects an "off" instruction. If the point of regard 8 is within the viewing area 13, the display controller 60 selects an "on" instruction. It can be appreciated that additional types of instructions can be selected such as dimming the display 12, adjusting size or focus of the content (e.g. blurring), locking out the device, or activating a screensaver, to name a few.

At block 310, the display controller instruction which has been selected is sent to display 110. As shown by the dotted line 312, the blocks 300 to 310 may be repeated to track a user 2 over a period of time. The frequency of tracking is determined at block 302 as part of determining a time to track the user 2. In another embodiment, instructions can also be sent to components of the mobile device 100 other than the display 12. For example, rather than or in addition to controlling the display, block 310 could instruct the subsystem responsible for security (not shown) to password-lock the mobile device 100.

In the above examples, the display controller application 60 detects and tracks the presence or absence of a single user 2. In other embodiments, the application 60 may be used to control the display 12 according to the detection of one or more users 2 and their respective points of regard 8. In such embodiments, it can be appreciated that the display controller application 60 may act to reduce visibility of what is being displayed even if, or especially because, one or more subjects are captured in the image. For example, when reviewing sensitive content, the display controller application 60 can trigger an instruction to reduce the visibility of the content when a second subject is detected in the image, for security purposes.

Figure 10:
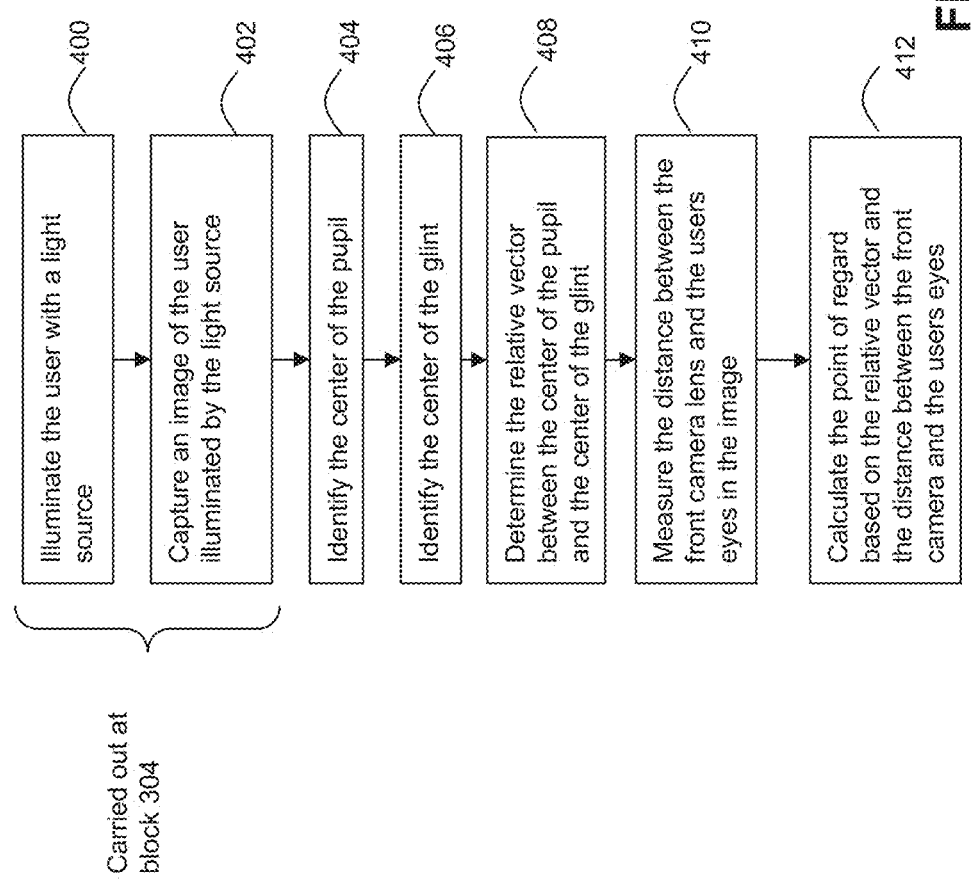
FIG. 10 is a flow diagram of an example process for determining a point of regard by eye tracking.

FIG. 10 shows a flow diagram of an example PCCR process to determine the point of regard based on eye tracking using the mobile device 100. It can be appreciated that the following description of the eye tracking operations is for illustrative purposes and that other methods of eye tracking are equally applicable to the principles discussed herein. At block 400, the user is illuminated by the light source 32. At block 402, an image of the user 2 illuminated by the light source 32 is captured by the front camera lens 30. As discussed in FIG. 8, blocks 400 and 402 are carried out at block 304.

At block 404 and 406, the center of the pupil and the center of the glint are identified, respectively. The relative vector between the center of the pupil and the center of the glint is then determined at block 408.

At block 410, the distance between the front camera lens 30 and the user's eyes 4 in the image is measured. The devices and methods of determining the distance between an object and a camera are known and can be used here. Examples of distance sensing devices include a camera, infrared optics, and an ultrasonic transmitter and receiver. Different combinations of distance sensing devices can also be used, and known methods associated with the devices for finding the distance between an object and a camera device 31 are applicable. In the example embodiment of FIG. 2, distance from the front camera lens 30 to an object is measured by a distance sensor 34 placed adjacent to the front camera lens 30. Although the distance sensor 34 is illustrated as a separate component in FIG. 2, the distance sensor 34 can be incorporated into other components of the mobile device 100. For example, a distance sensor based on infrared light can be incorporated into an infrared light source 32 also used to illuminate the user 2 when an image is captured.

At block 412, the point of regard 8 of the user 2 is calculated based on known methods using the relative vector and the distance between the front camera lens 30 and the user's eyes 4.

Figure 11:
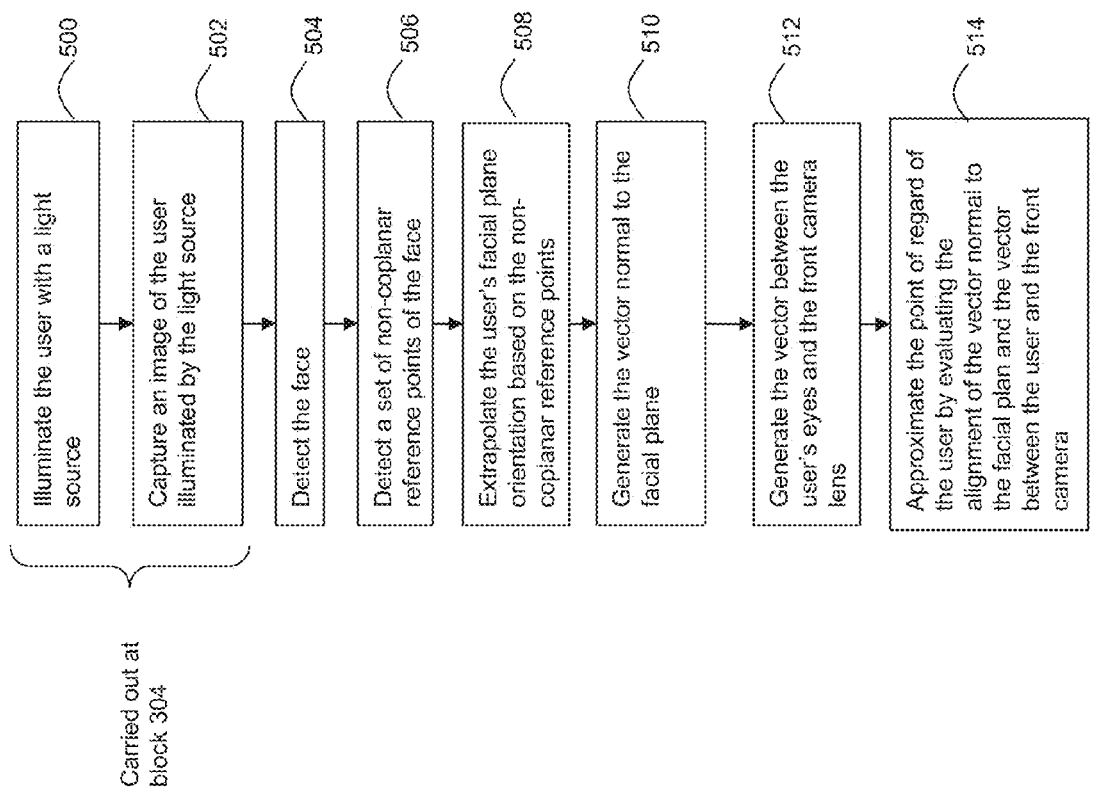
FIG. 11 is a flow diagram of an example process for approximating a point of regard by face tracking.

FIG. 11 shows a flow diagram of an example face tracking process to approximate the point of regard using the mobile device 100. It can be appreciated that the following description of the face-tracking operations is for illustrative purposes and that another method of face tracking is equally applicable to the mobile device 100. At block 500, the user 2 is illuminated by the light source 32 of the mobile device 100. At block 502, an image of the user 2 illuminated by the light source 32 is captured by the front camera lens 30. As discussed in FIG. 8, blocks 500 and 502 are carried out at block 304.

At block 504, the face of the user 2 is detected and at block 506, a set of non-planar reference points of the face (e.g. facial features such as eyes, mouth and nose) is detected. Facial recognition algorithms are known and can be used here.

At block 508, the orientation of the set of non-planar reference points is used to extrapolate the user's facial plane orientation. A vector normal to the facial plane is then generated at block 510. The normal vector of the facial plane is used to approximate the gaze direction 6 of the user 2.

At block 512, the vector between the user's eyes and the front camera lens 30 is generated to compare with the normal vector of the user's facial plane.

At block 514, the point of regard 8 of the user 2 is approximated by evaluating the alignment of the normal vector of the facial plane and the vector between the user's eyes 4 and the front camera lens 30. The point of regard 8 of the user 2 will lie within the viewing area 13 if the dot products of the two vectors are sufficiently aligned, where alignment may be evaluated using a user-specified or pre-programmed threshold. If the calculated dot product exceeds the threshold, the point of regard 8 is considered to lie outside the viewing area 13.

Figure 12:
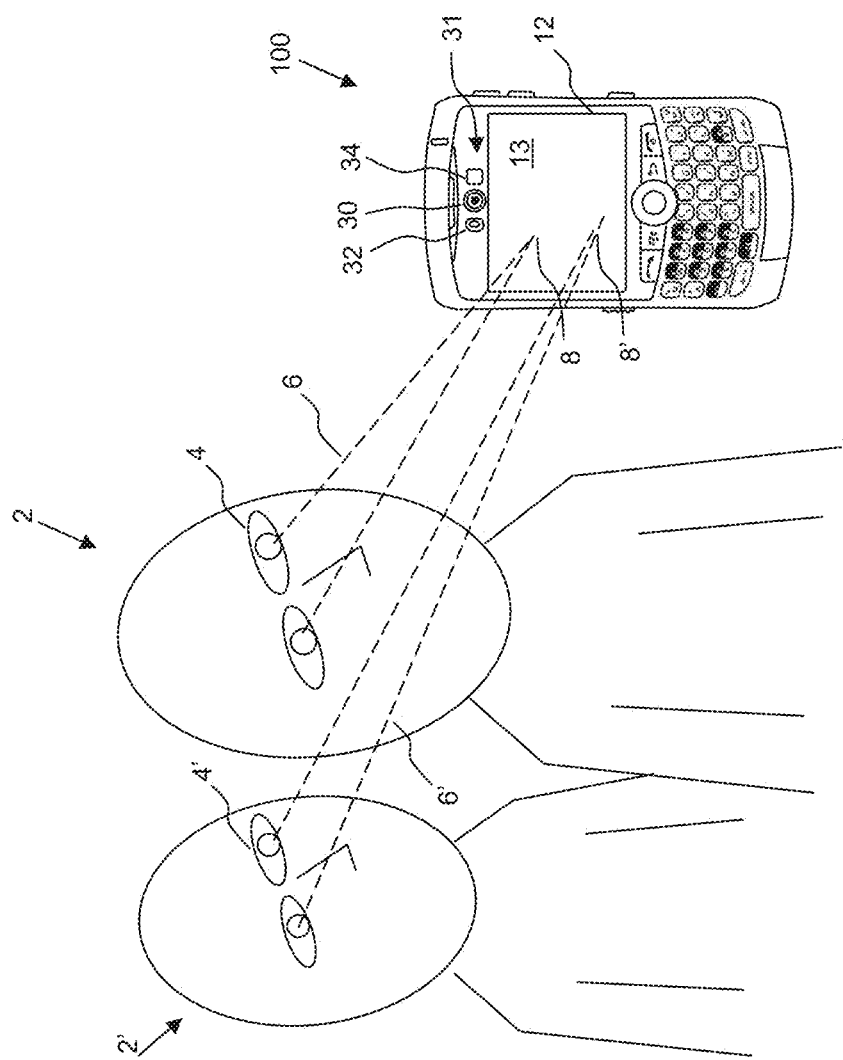
FIG. 12 is a schematic diagram of two users viewing the display of a mobile device.

Turning to FIG. 12, a schematic diagram is provided showing a first user 2 and a second user 2' viewing the display 12 of the mobile device 100. In this example, the mobile device 100 is situated in front of the users 2, 2'. The users 2,2' have respective pairs of eyes 4, 4' that have associated therewith, respective gaze directions 6, 6', and respective points of regard 8, 8'. The front camera lens 30, light source 32, and distance sensor 34 (collectively referred to as the camera device 31), can be used to track the gaze directions 6, 6' and points of regard 8,8' of the respective users 2, 2'.

In an example embodiment, the point of regard module 212 can be modified to be capable of detecting one or more users 2 and to determine their respective points of regard 8.

Figure 13:
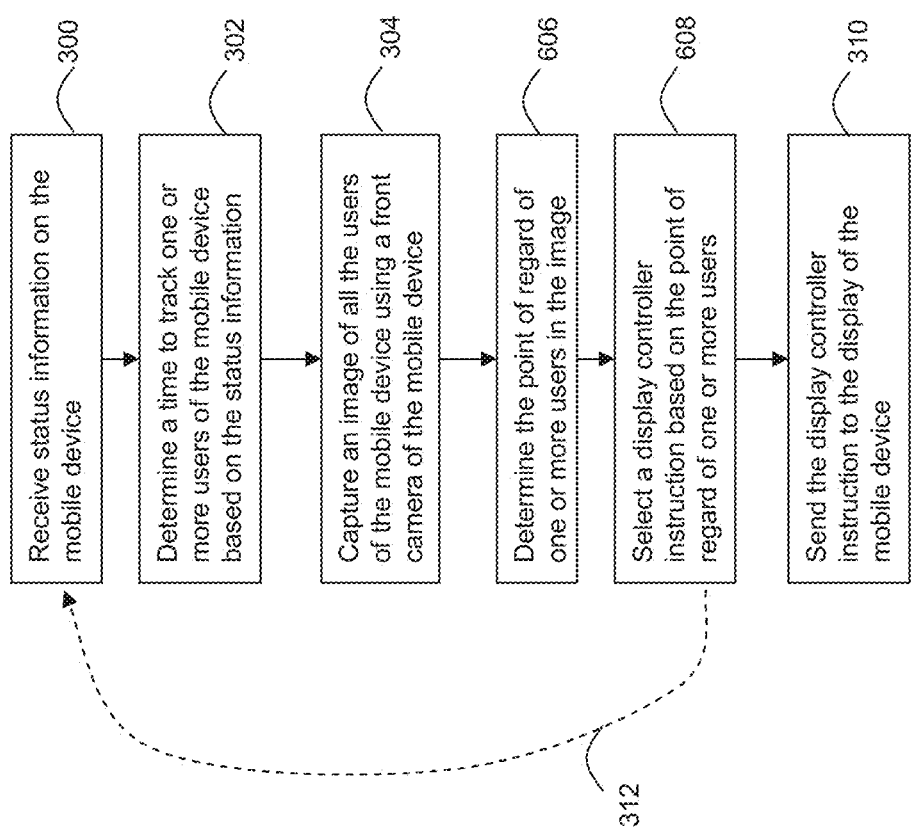
FIG. 13 is a flow diagram of example computer executable instructions for controlling a display based on the point of regard of one or more users.

Example computer executable instructions for controlling the display 12 of the mobile device 100 based on eye tracking of one or more users 2 are provided in FIG. 13. At block 300, status information on the mobile device 100 is received or otherwise obtained. Based on the status information, a time to track one or more users 2 of the mobile device 100 is determined at block 302. At block 304, an image of all users 2 that happen to be in the field of view of the camera lens 30 of the mobile device 100 is captured using the front camera lens 30. Using the image captured in block 304, the points of regard 8 of one or more users 2 is determined at block 606. At block 608, a display controller instruction is selected based on the point of regard 8 of one or more users 2. At block 310, the display controller instruction which has been selected is sent to display 110. As shown by the dotted line 312, the blocks 300 to 310 may be repeated to track one or more users 2 over a period of time. The frequency of tracking is determined at block 302 as part of determining a time to track the user 2.

As noted above, at block 606, the point of regard 8 of one or more users 2 is determined. In an example embodiment, block 606 can be implemented by repeating the eye tracking process shown in FIG. 10 (for determining the point of regard of a single user 2) for each user 2 captured in the image. In another example embodiment, block 606 can be implemented by repeating the face tracking process shown in FIG. 11 (for approximating the point of regard of a single user 2) for each user 2 captured in the image.

As noted above, at block 608, a display controller instruction is selected based on the points of regard 8 of one or more users 2. In an example embodiment, if more than one point of regard 8 is detected to lie within the viewing area 13, the display controller 60 can select an "off" instruction in order to prevent more than one user 2 from viewing the display 12 at the same time, e.g. for security reasons. In another example embodiment, the same can be achieved by selecting an "off" instruction if more than one user 2 is detected. Similar logic applies to other control instructions such as entering a "lock-out" mode or dimming the display 12.

Blocks 300, 302, 304 and 310 as discussed in the display controller 60 for a single user 2 are equally applicable for more than one user 2 and can be used here.

In another example embodiment, the display controller 60 can select an instruction based on the point of regard 8 of one specific user 2 out of the set of users 2 captured in the image. For example, the display controller 60 can select an instruction based on the user 2 at the shortest distance from the mobile device 100, as measured or otherwise obtained by the distance sensor 34. Such a user 2 is likely to be the user 2 operating the mobile device 100 (referred to as the "operating user"). By tracking the operating user only, the display controller 60 can function in a similar manner as the single user 2 case.

In another example embodiment, the display controller 60 can select an instruction based on the point of regard 8 of a subset of specific users 2 out of the set of users captured in the image. For example, the display controller 60 can select an "off" instruction if any user 2, that is not the operating user, has a point of regard 8 within the viewing area 13. In this example, the display controller 60 prevents another user 2 from spying or inadvertently observing content on the display 12 while the mobile device 100 is used by the operating user, again for security purposes.

As discussed above, the calibration module 211 can be used to initiate a training routine to train the display controller application 60. FIG. 14 illustrates an example set of computer executable instructions for implementing an example training routine. At 700, the calibration module 211 detects initiation of the calibration routine. For example, the mobile device 100 may perform periodic calibrations, a user may select an option from a menu (not shown), or an application may make such a request, e.g. based on quality factors or other criteria. At 702, the calibration module 211 enables a prompt to be displayed (not shown) that instructs the user to move the mobile device 100 into different positions with respect to their face/eyes. For example, the prompt may step through a series of positions asking the user 2 to hold the positions until an image has been taken. Any number of distinct positions can be used. At 704, an image is captured at each position. From the image, various characteristics can be determined such as what shape the face/eyes take when viewed from the particular position corresponding to that image. The accelerometer 125 may also have a particular reading that can be correlated with the image characteristics at 706. The calibration data may then be stored at 708. The calibration data can be used to enable the display controller application 60 to operate more efficiently. For example, if the display controller application 60 would obtain a false negative due to the subject taking a particular shape in a particular position but during training it is determined that when the user tilts the mobile device 100 in a particular way they appear in the form of the particular shape when an image is taken, such false negatives can be avoided. As noted above, during the calibration process, the display controller application 60 can be operable to prompt the user to both look straight at the display 12 for a particular held position, and then look away from the mobile device 10 at the same position. In this way, the display controller application 60 is provided with two points of reference to thereafter judge whether or not the user is likely glancing at the display 12. Accordingly, operation 704 in FIG. 14 may include the acquisition of more than one image at each position.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific example embodiments, various modifications thereof will be apparent to those skilled in the art as outlined in the appended claims.

The invention claimed is:

1. A method of controlling a display of a mobile device including a camera, comprising:
    capturing a first image including a person, using the camera, the camera being directed in a same direction as the display;
    determining in the first image, a first point of regard indicative of an area on the display at which a gaze of the person is directed;
    capturing a second image including the person, using the camera, the capturing according to a frequency, the frequency determined according to a criterion associated with a location of the mobile device;
    determining a second point of regard in the second image; and
    modifying visibility of at least one portion of what is presented on the display of the mobile device when the second point of regard is directed to an area off the display.

2. The method of claim 1, wherein the step of modifying visibility includes performing one or more of the following: turning off the at least one portion of the display, initiating a screensaver, dimming a backlight, adjusting a focus of content being presented on the display, and locking-out the mobile device.

3. The method of claim 1, wherein the first point of regard and the second point of regard are determined using at least one of eye tracking and face tracking.

4. The method of claim 1, wherein the frequency is proportional to sensitivity of the content.

5. The method of claim 1, wherein the mode of the mobile device is a security mode.

6. The method of claim 1, wherein the step of modifying visibility includes reducing visibility.

7. The method of claim 1, wherein the first image and the second image are captured using a same camera.

8. The method of claim 1, wherein the person is a user of the mobile device.

9. A mobile device comprising a processor, memory, a display, and a camera, the memory storing computer executable instructions for:
    capturing a first image including a person, using the camera, the camera being directed in a same direction as the display;
    determining in the first image, a first point of regard indicative of an area on the display at which a gaze of the person is directed;
    capturing a second image including the person, using the camera, the capturing according to a frequency, the frequency determined according to a criterion associated with a location of the mobile device;
    determining a second point of regard in the second image; and
    reducing visibility of at least one portion of what is presented on the display when the second point of regard is directed to an area off the display.

10. The mobile device of claim 9, including an accelerometer, and in which the change in orientation of the mobile device is detectable by the accelerometer.

11. The mobile device of claim 10, wherein the camera does not capture a next second image when the accelerometer detects that the mobile device is being rotated quickly.

12. The mobile device of claim 9, wherein the mode of the mobile device is a security mode.

13. The mobile device of claim 9, wherein the first image and the second image are captured using a same camera.

14. The mobile device of claim 9, wherein the person is a user of the mobile device.

15. A non-transitory computer readable storage medium for controlling a display of a mobile device including a camera, comprising computer executable instructions for:

capturing a first image including a person, using the camera, the camera being directed in a same direction as the display;

determining in the first image, a first point of regard indicative of an area on the display at which a gaze of the person is directed;

capturing a second image including the person, using the camera, the capturing according to a frequency, the frequency determined according to a criterion associated with a location of the mobile device;

determining a second point of regard in the second image; and modifying visibility of at least one portion of what is presented on the display when the second point of regard is directed to an area off the display.

16. The non-transitory computer readable storage medium of claim 15, wherein modifying visibility includes performing one or more of the following: turning off the at least one portion of the display, initiating a screensaver, dimming a backlight, adjusting a focus of content being presented on the display, and locking-out the mobile device.

17. The non-transitory computer readable storage medium of claim 15, wherein the first point of regard and the second point of regard are determined using at least one of eye tracking and face tracking.

18. The non-transitory computer readable storage medium of claim 15, wherein the frequency is proportional to sensitivity of the content.

19. The non-transitory computer readable storage medium of claim 15, wherein the mode of the mobile device is a security mode.

20. The non-transitory computer readable storage medium of claim 15, wherein the modifying visibility includes reducing visibility.

* * * * *